United States Patent [19]

Duffy

[11] Patent Number: 4,758,956

[45] Date of Patent: Jul. 19, 1988

[54] SYSTEM FOR REPLACING DEFECTIVE PORTIONS OF LOG DATA

[75] Inventor: John A. Duffy, Broken Arrow, Okla.

[73] Assignee: Amoco Corporation, Chicago, Ill.

[21] Appl. No.: 856,612

[22] Filed: Apr. 25, 1986

[51] Int. Cl.$^4$ .......................... G06F 7/22; G01V 1/40; E21B 49/00
[52] U.S. Cl. ..................................... 364/422; 73/152; 367/25
[58] Field of Search .................... 73/151, 152; 367/25; 364/422

[56] References Cited

U.S. PATENT DOCUMENTS

| | | | |
|---|---|---|---|
| 3,927,308 | 12/1975 | Summers et al. | 364/300 X |
| 4,293,933 | 10/1981 | Park et al. | 367/25 |
| 4,321,670 | 3/1982 | Timmons | 364/300 |
| 4,541,275 | 9/1985 | Kerzner | 73/152 |
| 4,586,137 | 4/1986 | Frost, Jr. et al. | 364/422 |
| 4,646,240 | 2/1987 | Serra et al. | 364/422 |

OTHER PUBLICATIONS

Gauntt, J. C. et al., "The Use of Core Analysis Data to Explain the Abnormality of Low Resistivities of Some Hydrocarbon Productive Simpson Series Sands in Central Oklahoma", *Fourth Annual Logging Symposium Transactions,* May 1963, XV-1 through XV-24.

Nurmi et al., "Synergy and Techniques of Combining Core and Well-Log Data in Carbonate Reservoir Studies", S.E.M.P. Core Workshop, 1, 1980, 118–119.

Beinkafner, K. J., "Computer Processing of Dipmeter Log Data: Enhancement of a Subsurface Exploration Tool", 27th International Geological Congress, Moscow, abstracts, vol. 8, 1984, 330-1.

*Primary Examiner*—Jerry Smith
*Assistant Examiner*—Clark A. Jablon
*Attorney, Agent, or Firm*—Scott H. Brown; Fred E. Hook

[57] ABSTRACT

A compter-based log processing system is described herein for exploring a subsurface formation and that uses log signals and dip signals. The system includes signal processing circuitry for storing each signal as a value individually within a universally formatted relational data base, for identifying any portions of the log signal and the dip signal that are unacceptable, and means for replacing the identified unacceptable portions of either signal with a corresponding acceptable portion from the other signal. Further, the system has the capability of processing dipmeter data, as well as log data, utilizing conventional log processing editing, plotting, and analysis programs on a single system.

7 Claims, 1 Drawing Sheet

SYSTEM FOR REPLACING DEFECTIVE PORTIONS OF LOG DATA

BACKGROUND OF THE INVENTION

1. Field of the Invention

The present invention relates to a log processing system and, more particularly, to such a computer-based system which has the capability of processing dipmeter logs and conventional logs on the same system.

2. Setting of the Invention

In the exploration for oil and gas, various logs are obtained by passing a succession of tools through a wellbore traversing a subterranean formation. The logs are later processed or enhanced by using a programmable digital computer with one or more log processing software programs. Such logs include resistivity, gamma ray, permeability, water saturation, porosity, and the like, as is well known in the art. Another log which is often used is dipmeter log, which in essence is a microresistivity log. The dipmeter log is used to detect, identify, and analyze the various formations or beds below the earth's surface to determine the inclination of the formations, to identify faults, and to determine the position of the wellbore in relation to these features.

Since the dipmeter log is actually a microresistivity log, some resistivity logs and a dipmeter log obtained from the same formation and wellbore should be closely related, if allowance is made within the analysis for the physical natures of the different tools used and possibly for differences in data recording techniques. Often a resistivity log and a dipmeter log are not in agreement, and the only way to tell if the two logs were in agreement was to plot both logs on paper separately and then physically lay the dipmeter log alongside the resistivity log. A trained log analyst then has to determine if there is agreement between the two logs.

There is a need for a log analyst to be able, at one location and using a single computer-based system, to correlate dipmeter logs with other logs. There is a need for a system whereby the log analyst can evaluate information from other logs and from other sources, such as cores, and calculate results of other analyses concerning the conditions in the subterranean formation which might bear on the interpretation of the dipmeter data. Further, there is a need for a system that can allow the log analyst to re-examine the results of the other log analyses in light of the information from the dipmeter log. The inventor of the present invention knows of no such computer-based log processing system that has the capability to meet the above described needs.

Oftentimes, in obtaining the various logs, inaccurate data values occur, i.e., a resistivity measurement or a porosity measurement is either far less than or far more than what could even be conceivably possible for that particular formation. Also, oftentimes there are missing data points in the log. In each of these cases, the log analyst has to determine whether a new logging run must be made to obtain the data that is either in error or missing. While the log analyst is making this determination concerning the quality of the logging run, the operations at the well site have to stop until it is determined whether to re-log the well, complete the well, abandon the well, or drill further. Obviously, relogging of the well is extremely time consuming and very expensive. Having all work at the well site stop until completion of these analyses is even more expensive. There is a need for a single computer-based log processing system capable of reviewing log data, determining whether the data is acceptable, editing the log data to minimize additional processing runs, and conducting sufficient analyses to allow the user to determine what future course the drilling or well completion activity should take.

Oftentimes there is a need to analyze logging data obtained from previously drilled wells. While timely response is not as critical for this activity as for the activities previously described, the analysis and editing operation are of greater importance. Here the log analyst cannot simply order an additional logging run; after the decision concerning the fate of the well is made, the borehole is either lined with cement and steel or the well is plugged. In either case, additional logging runs are not possible. If the log analyst cannot find a particular log or the archival log is defective, there is need for a system capable of calculating the desired log values from other available logging data or substituting an acceptable log for the defective log. The results of these analyses lead to a more accurate knowledge of the subsurface geology and better direction of the exploration effort.

One log that can be used to calculate other log values is a dipmeter log. One of the primary problems encountered in trying to calculate other log values from a dipmeter log is that prior log processing systems treat the dipmeter log data totally differently than other logs, i.e., the dipmeter data is in a different format and is usually contained within different data bases. Therefore, prior log processing systems process dipmeter logs using a completely different set of log analysis or log processing software. Therefore, if the log analyst desires to use dipmeter data along with other conventional log data, then the log analyst has to use at least two different log processing systems and do some of the calculations by hand or visually by putting the logs together side-by-side. There is a need for a log processing system that can access differing data and oftentimes different formats in a timely fashion to allow the the dipmeter logs and the other conventional logs to be used in the same system. By treating the raw dipmeter logs and the results of the dipmeter analysis as the same kind of data as the conventional logging data, the log analyst can compare the results of different analyses with each other, can review the interpretation of the dipmeter log in light of the results obtained by the conventional logs, edit either for anomalous or invalid results, and perform these tasks in a sufficiently timely fashion to allow investigation of a variety of different hypotheses concerning the composition and slope of a formation. The inventor hereof knows of no such computer-based log processing system that has these capabilities.

SUMMARY OF THE INVENTION

The present invention provides a method for processing logs, including dipmeter logs, and a related computer-based log processing system for exploring a subsurface formation. Log signals and dip signals derived from at least one investigating device passed through a borehole traversing the subsurface formation are used in the system which identifies any portion(s) of the log signal or the dip signal that is or are unacceptable, and replaces the identified unacceptable portions of either signal with a corresponding (same depth in the borehole) acceptable portion from the other signal. Further, the present invention can include signal processing means for comparing the log signal to the dip signal over a certain depth increment and for generating a correlation factor signal between the compared log signal and the dip signal over the depth increment.

The system of the present invention has been developed to overcome the above-described deficiencies and meet the above-described needs. The present invention provides a computer-based log processing system which is capable of processing dipmeter logs and other logs on a single system. Further, the system has the capability of visually and/or graphically displaying one log alongside or on top of another to bring the logs onto a common depth reference. The system also provides the log analyst with the capability to manually or automatically calculate the dip of subsurface formations, has the capability of performing analyses and storing the results for further use, and mechanisms for determining the statistical and geological relationships between sets of data, either through numerical analysis or visual analysis.

DETAILED DESCRIPTION OF THE PREFERRED EMBODIMENT

Figure 1:
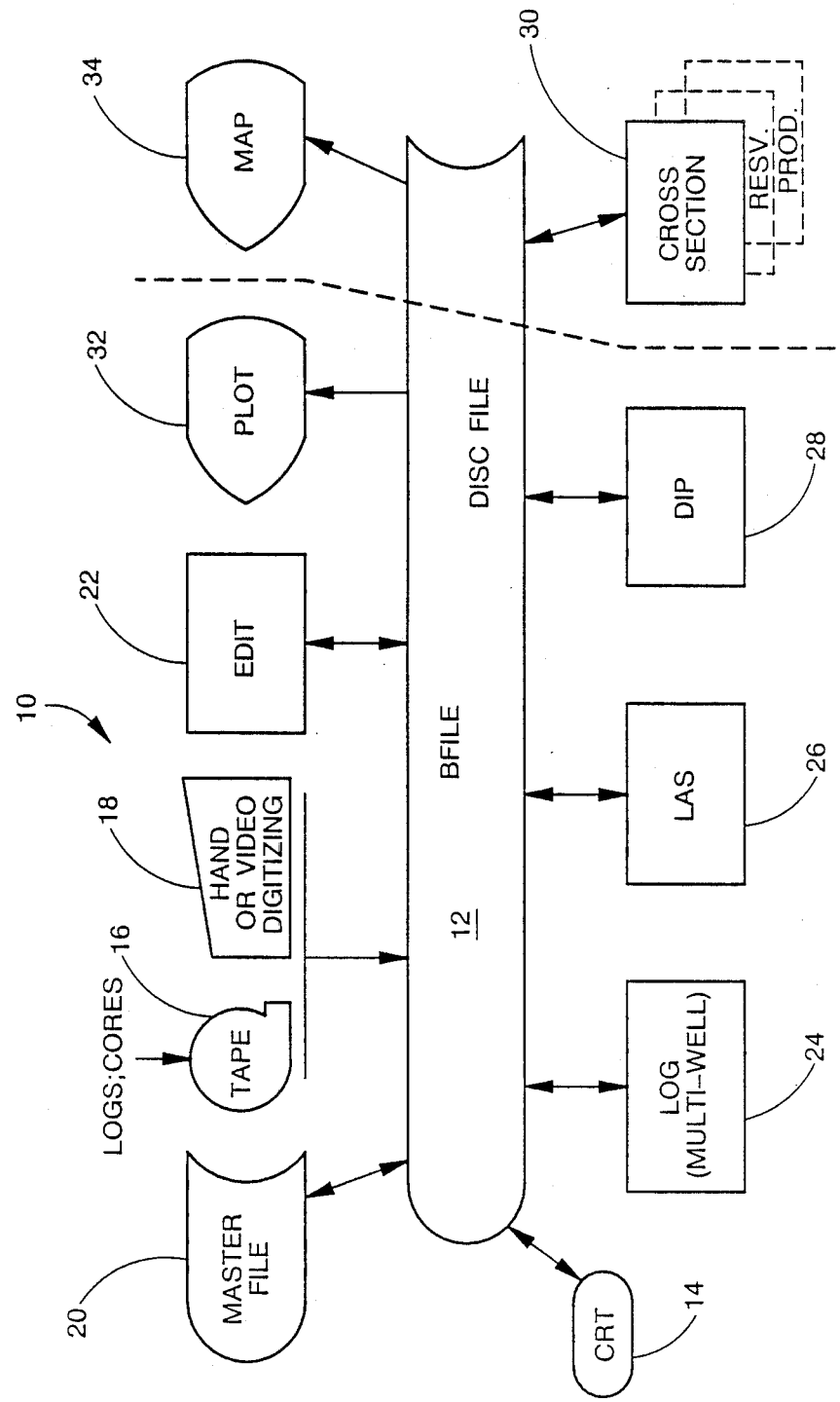
FIG. 1 is a block diagram of a log processing system which embodies the present invention.

The present invention provides a computer-based log processing system for exploring a subsurface formation using log signals and dip signals derived from at least one investigating device passed through a borehole traversing the subsurface formation. In the present system, signal processing means are provided for identifying any portion(s) of the log signal or dip signal that is or are unacceptable, and for replacing the identified unacceptable portions of either signal with corresponding acceptable portions from the other signals. In another embodiment of the present invention signal processing means are included for comparing the log signal to the dip signal over a depth increment, and for generating a correlation factor signal between the compared log signal and the dip signal over the depth increment.

As used herein, the following words have the following meanings. Signal processing means can include any analog or digital computer program designed or written for processing, analyzing, computing or interpreting data representing signals or signal values.

Log signals can include any analog or digital data, signal, or signal value generated by a conventional logging tool, such as resistivity, porosity, permeability, water saturation, eh, ph, gamma ray, neutron, or the like.

Dip signals can include any analog or digital data, signal or signal value generated by a dipmeter logging tool.

Log curve is a stream of data, signals or signal values generated by an investigating device as it is passed through a borehole and plotted either visually or on a hardcopy format.

The present invention will be discussed hereafter with reference to FIG. 1. Reference numeral 10 generally indicates one embodiment of a computer-based log processing system of the present invention that includes a suitable computer disk file 12 entitled the "BFILE" which can be the RIM data base management system produced by Boeing Computer Services. Other disk files that can be used are a custom designed data base manager developed specifically for this invention or DB2, marketed by International Business Machines.

Having access to the disk file 12 are a plurality of computer programs used for processing and analyzing the log signals and the dip signals. Each of such programs will be briefly described, but a more detailed description of each program will be made later.

The CRT 14 is an information display and input device, such as a "dumb" terminal, like an IBM 3200 terminal, or a "smart" terminal with its own computing capability, like an IBM PC XT or AT. The CRT 14 is in two way communication with the disk file 12, as is well known to those skilled in the art.

Data, signals, and signal values are inputted into the system 10 via suitable tape drives 16, hand or video digitizing equipment 18, and a master data storage file 20. A suitable editor computer program, entitled here EDIT, 22 is provided for quality control and preprocessing enhancements of the data.

The primary log processing programs, of the type commercially available, include a multiwell log processing program LOG 24, a single well log processing program LAS 26, a dipmeter processing program DIP 28, and a synthetic seismogram program CROSS-SECTION 30. These programs are used by the log analyst to produce edited and processed/improved data that then can be displayed visually on the CRT 14, stored in the master file 20, and/or plotted or mapped in a hardcopy format utilizing the computer programs PLOT 32 or MAP 34, respectively.

One of the main advantages of the present invention is the system's capability of processing log signals, as well as dip signals using a single suite of programs. This capability is partially provided by the following unique aspects of the disk file 12.

Whatever specific disk file 12 is used, it is important that the disk file 12 and the data base management computer programs maintain the top, base, and sampling increments of the log data separately for each logging curve. Further, it is important that within all of the computer programs using the disk file 12, provision be made for intermixing the data sampling rates at the user's discretion. Alternatively, the log depth can be stored using the disk file 12 with each log data point. Additionally, log data is preferably treated separately, that is, all or part of the data for one logging curve can be loaded or recalled by itself; the system 10 does not have to process an entire complex of log data to obtain the individual values required to generate one logging curve. The disk file 12 preferably allows the computer programs in the system 10 to retrieve logging data directly, using, for example, the well name, curve name, and requested depths as keywords. This direct access of selected data using a keyword method allows a timely response to the internal request of the computer program. The disk file 12 contains an internal data format descriptor, that is, a method within the file itself of describing the type of data contained within a given record; this descriptor can be a record type identifier convention or an explicit format description convention as in the RIM implementation of the disk file 12. For accessing ease, the disk file 12 preferably contains an internal inventory of the files, such as wells, contained in the disk file 12.

From the above description, it can be seen that the overall purpose of the disk file 12 is to develop a mechanism for processing data which can contain, within the individual data files, enough information to interpret the data within each file without reference to external computer program and/or data base formats or conventions. Although the disk file 12 is referred to as a disk file, any equivalent medium can be used as a substitute so long as the direct access characteristics of the BFILE can be maintained.

The disk file 12 is the major storage mechanism and assembly point for all inputted data and all the computer programs to interact in unison or as desired by the log analyst. Data contained on logging tapes, such as Schlumberger, Welex, and Gearhart LIS format tapes, Dresser bit format and other tapes, core data files, and other data files as required, are provided through at least one tape drive 16, other disk files and/or through hand or video digitizing devices 18 for input into the disk file 12. Thus, similar data from a variety of different sources can be grouped in the disk file 12 and accessed by the log analysis computer programs, such as those described above, without reference to the source from which the data came. While individual computer programs within the system 10 can use internal work files, as convenient, the results from the log analysis programs are preferentially put back in the disk file 12 as storage if the data is to be used by other log analysis computer programs within the system.

The use of a common data management procedure within the system, as described above, allows the use of a variety of different sources of data without reprogramming each analysis computer program for every data source. Within the system, one computer program is written to load data from a single source, such as a tape drive 16, to the disk file 12, and all computer programs requiring that data have access to it. This capability also allows the user to utilize different analysis computer programs to analyze the same data as desired, without having to have special programs written to transfer data from one system to another. The system 10 is preferentially designed in a user-friendly format so that menus are provided for the log analyst to determine which logs are to be read in or which logging files or signals are to be read in, and which function is next desired.

After the raw data is read into the system 10, usually the data is edited using a editor computer program 22, as is well known in the art. The editor program 22 allows the user to remove any extraneous data and identifying any data that needs to be altered for proper utilization within the system. The log analyst after editing the data can have a hardcopy plot of the data made on a hardcopy plotter 32, if desired. This hardcopy plot can contain the data just read into the system or can contain data read into the system earlier from any of a variety of sources and perhaps at a variety of sampling rates.

Another feature of the system 10 is the capability of performing multiwell log processing using LOG 24, thus allowing the log analyst to perform analyses concerning several individual wells. With this capability, the log analyst can look for similarities and differences between logs from many different wells on which the individual analyses were performed all within the same system and data base, such as the disk file 12.

As mentioned earlier, the inventor hereof knows of no computer-based log processing system which is capable of using dipmeter analysis programs with and on the same system as other log analysis programs. This capability, while appearing simple, is a major advance because the dipmeter data as it arrives through the tape drive 16 into the disk file 12 is maintained within the same data management system and within the same protocol as that used for conventional logs. Moreover, since all logging data conforms to this protocol, any logs from any source can be mixed in the analysis programs (LOG, LAS, DIP or CROSS SECTION) as desired without reference to the source from which the data was obtained. Previous systems could not do this because the programs within the system require all data for a given analysis be of the same sampling rate, i.e., a data point or value every foot or the like. Requiring the computer programs in the present system to honor the original sampling rate for the data simultaneously allowed the greatest possible accuracy in the data by maintaining the original form of the data throughout the system, and eliminated several resampling and reformatting computer programs previously required to go from one system to another. This capability also eliminated a variety of computer programs which each system previously maintained separately to read and write data. Now in the system 10 one program is used to process data from a particular external format and all the programs within the system have access to data in that format without alteration.

Another important feature of the system 10 is the capability of using other data, such as reservoir data and seismic data, on the same log analysis system. In FIG. 1, the blocks shown to the right of the vertical dashed line are additional computer programs that can be included, such as a program for developing synthetic seismograms CROSS SECTION 30, as described in U.S. Pat. No. 4,293,933. Another computer program uses analysis programs and the display capability of the system 10 for reservoir data and production data. Further, hardcopy plotting devices 32 and 34 are provided to produce black and white or color plots and maps.

In one embodiment of the present system, the following major components are available:

1. A mechanism for reading data.
2. A mechanism for writing data.
3. A mechanism for creating hardcopy plots and graphs.
4. A mechanism for editing data already on the BFILE.
5. A mechanism for analyzing well log data.

Each of these mechanisms is a separate section within the system; although each creates and uses different subfiles as required by the functions that each performs, all of them use the disk file 12 as the primary mechanism for data storage and retrieval. The user can invoke these sections in any logically consistent order to accomplish the particular task desired.

To illustrate the unique features of the present invention, a detailed examination of the data input section is in order. While this description relates only to the methodology employed in reading the input data, those skilled in the art will realize the implications of this procedure for the using programs and why this invention allows dipmeter data to be integrated with data from conventional logs.

Within the mechanism for reading data are computer programs which read tape or disk files in particular vendor formats and load them into the disk file 12 for the use by or with the other computer programs for log analysis within the system. Among these are programs to read the log information standard format, a format first proposed by Schlumberger, Inc., and currently used by a number of vendors to record well log data; a program to read well log tapes written by Dresser-Atlas, Inc.; and a number of optional programs to read optional proprietary formats. Although all of these programs are shown in this illustration as working from a tape drive 16, those versed in the art will recognize that data files resident on tape can be copied to a number of other devices and read from them just as well as from the tape drive 16. Within each of these programs is a selection mechanism for the wells and curves within the input data set, so the user can select particular wells or curves from the tape if the log analyst does not wish to analyze all of the data on the tape.

Within all of the programs in the input section, the general mechanism for handling the transfer of data from the tape to the disk file 12 is the same. The control inputs which specify which wells or curves the user desires are read and checked for validity, and the disk file 12 is prepared to receive the data, usually by entering the new wells and curves into the well inventory mentioned earlier. If the control inputs are in error or if the disk file 12 is not able to receive the data, the program informs the user concerning the nature of the problem and stops. Having ascertained that the control inputs are acceptable, the programs then begin to read or input the data.

First, the data on the tape is translated, if necessary, from the particular codes used by the vendor into codes and representations understandable by the particular computer on which the system is running. If, for instance, the input tape is written in codes used in IBM equipment and the system is running on equipment made by Perkin-Elmer, it would be necessary to translate all the character data but none of the numerical information. If the same input tape were read on IBM computers, no translation at all would be necessary. In the most extreme case, as in input tapes written on Digital Equipment Corporation equipment while the system is running on IBM equipment, all the codes must be translated. Those well versed in the art will recognize this procedure and will understand that while the system in general can be run on a variety of different computers, this system section must be written, at least in part, specifically for the equipment on which this version of the input section is executing. On the other hand, one of the important advantages of this method lies in the fact that implementation on new computing equipment requires making appropriate changes within this section, along with similar changes in the output data section and the data base manager, instead of having to make the same changes to input and output sections within all the computer programs in the system.

Having translated the input data tape and made the data stream understandable to the loading program, possibly with the assistance of temporary data files, the process of loading data to the disk file 12 is begun. The translated data is also checked against the control information verified during the first section and eliminates wells and curves which the user does not desire loaded. The program adds the wells and curves requested by the log analyst to the inventory maintained within the disk file 12, while incorporating additional information obtained while reading and translating the data tape in the second section. If possible, the program also checks to be sure that the disk file 12 has enough free space to contain the input tape data. At this time, the program also checks the input data stream for information which might be relevant to individual engineering data sections (curves) and which might be required for further processing within other sections, such as plotting information, notes made at the well site concerning a particular curve, dates, temperature information, and the like. These can be put in the disk file 12 at this time or later on as the user finds convenient.

Having prepared the input stream and the disk file 12, the user then separates the engineering values into individual curves if necessary. Those versed in the art call this process "demultiplexing." Having demultiplexed the input stream, the system program loads the data to the disk file 12 using keys derived during the third section; these keys comprise an arbitrary label assigned by the user, the well name, the curve name, and the depth range. The data base manager maintains an inventory of these curves and depths, and is responsible for relating the key and depth ranges in a load or retrieval command to individual measurements on the disk file 12. The program informs the data base manager that the data supplied is to be loaded with the keys provided; the data base manager processes the request, writes the data provided to the disk file 12 if the request is valid, and returns error codes to the calling program if problems are encountered. Implicit within this is the ability of the data base manager to maintain sampling frequencies for each curve independent of the sampling frequencies for other curves within the same well; indeed, once written to the disk file 12, the using program can, if desired, retrieve data from a variety of different sources and sampling frequencies indiscriminately, providing, of course, that the requesting program supplies the data base manager sufficient work space to comply with the request. In effect, each engineering value is written to the disk file 12 with sufficient information to allow the data base manager to retrieve it by itself if necessary. This type of organization also forces the requesting programs to honor the differing sampling frequencies which can be in the curves which they request and act accordingly.

One of the features that distinguishes this method of data management from other systems in the fact that the disk file 12 preferentially maintains individual sections of engineering data, instead of maintaining all of the curves from a given depth together (multiplexed), and maintains a top, base, and sampling rate within the index separately for each curve. The data base manager preferentially retrieves or loads a single curve at a time.

Given sufficient keys, as outlined above, the data base manager can determine which measurements relate to which depths by interrogating the index to determine the top, base, and sampling frequency for the curve and then computing which individual measurement or measurements the calling program is requesting. This procedure allows the data base manager to select an individual measurement, if requested, instead of retrieving all the data input at a given depth; this ability is important to the ability of the system 10 to integrate dipmeter data into all the programs within the system.

The translation section translates different types of data, including dipmeter data; the load section loads all kinds of data, including dipmeter data. If this method is not employed, for instance, if the data manager requires, retrieval of all the curves at a single depth, data from differing sources and with differing sampling frequencies cannot be mixed. Since the dipmeter data is recorded at a much higher sampling rate (60 measurements per foot for each of 5 to 15 curves, in one example) than conventional well log data (2 measurements per curve per foot), data base managers in prior methodologies had to convert all the measurements to 60 measurements per foot, and waste large amounts of disk space and processing time, or resample all fast channel data to the slower rate, a process which makes it impossible to compute dips accurately. Moreover, since each curve stands as a separate entity, all curves appear to the requesting program in the same fashion; since the requesting program must honor the sampling frequency of the individual curve, dipmeter data can be managed by all programs within the system 10 just like any other type of logging signal.

Although the development of the system 10 arose from a need to incorporate dipmeter data with conventional well log data, those experienced in the art will recognize that the system 10 also facilitates the incorporation of a variety of other types of possible data within the data base management system, such as cores, paleontological information, and the like. Since it is the responsibility of the data base manager to translate from keys containing depth information to individual data items on disk, once the data base manager has been programmed to recognize the particular type of data, all the using programs have immediate access to it with minimal, if any, changes.

As mentioned earlier, sources of data other than tapes can be used. The procedure for digitizing data by a hand or video digitizer 18 is very much the same as the procedure for reading tapes. In this case, instead of having to translate from a variety of different tape formats, the program translates from a number of possible digitizing mechanisms 18. The particular digitizing mechanism 18 is described to the program prior to adding the data to the disk file 12 so the program will recognize the nature of particular requests from the input device for service and respond appropriately. This routine also acts an an interface between the host system and the digitizing mechanism (as in the input section) but the data from this section, once loaded to the disk file 12, is maintained and used just like all other well logging curves within the system 10, from whatever source. Similar requirements also apply to the program for loading data, to/from the disk file 12 from/to the master file 20.

At this point a few comments concerning the relationship between the BFILE and the master file 20 are in order. Within one embodiment of the system 10, the disk file 12 is considered a work file for the user to use as desired. Once the user has completed analyzing the data, the resultant curves can, if desired, be loaded back to the master file 20. Although there is no reason why this system 10 could not be used for maintaining master files, allowing the user to work within the master file directly rather than indirectly, within this particular implementation this was not done. Part of the reason for this decision lies in the fact that the log analyst can attempt a variety of different solutions and parameter values before arriving at what is considered a final solution to the problems dealt with in log analysis. It was felt that only the final results, if needed, be put back on the master file 20. This saves computer resources, since only the necessary information is loaded to the master files while the individual log analyst's file (containing all the intermediate solutions and rejected attempts) is deleted. Secondly, this approach helps prevent other log analysts from unknowingly retrieving intermediate results and using them as if these were the final results of the analysis.

The procedure for writing data from the disk file 12 to other formats is the inverse of the process for reading data into the disk file. First the control inputs are checked for validity and consistency. Then the disk file 12 is checked and the requested information, curve by curve, is retrieved and, if necessary, placed on temporary work files. Finally the information is arranged in the order required by the output format, translated if required by the particular combination of output format and host machine in use, then written to the output medium. Depending on the nature of the request, it may be written to a tape drive, another disk file, or to a hardcopy device.

The plotting section, mentioned above, is designed around the ability of the data base manager to retrieve information individually from the disk file 12. Having checked the control information for validity and consistency, a program retrieves individual curves from the disk file, integrates these curves as required by the plot request with other curves, honors the different increments from each curve if necessary, and constructs the output stream in the form designated by the control section. While different types of plots can require different types of data, the program must deal with the sampling frequency of each curve. Thus, all curves appear identical to the plot program, and dipmeter data can be plotted indiscriminately with curves of other types from other sources if requested by the log analyst.

This ability to mix information also allows the program to mix information from other sources, such at the analysis section, within dipmeter plots. One device used to accomplish this in the present implementation is the ability of the program to add information to the plot depending on the value of another curve commonly called a "discriminator curve". This curve can be generated from any source, but is commonly constructed either by the log analysis program or by the log editing section. It is a curve, constructed and written to the disk file 12 just like any other curve, but instead of engineering values at each depth, the curve contains whatever arbitrary values the log analyst wished to place there. Having constructed the grid to be output at this depth, the program recalls the value for the discriminator curve at this depth. If this value is appropriate, the engineering values for this depth are added to the section of the plot being prepared; if not, only the grid is drawn. If the discriminator curve, for example, was constructed to indicate whether or not the tool had encountered shale at that depth, the resultant plot would contain information where shale was indicated, would be blank where it was not. Since this capability is present no matter what kind of curves are being plotted, both dipmeter data and non-dipmeter data can be plotted in this fashion. Those versed in the art will recognize that the particular values used to cause the program to plot or not to plot are arbitrary; in this implementation all the curves are plotted if the value for the discriminator curve is zero, no data is added to the plot if the value is not zero. Those versed in the art will also recognize that while this particular implementation has a single discriminator for all curves, there is nothing within this description that would prevent multiple discriminators, a discriminator for each curve, or any combination of these features. The data management and data retrieval features of the plotting section are a part of this invention; however, the particular plots and listings generated by this section are well known to those versed in the art.

Within the system 10, the edit section (EDIT 22) is responsible for displaying information loaded to the disk file 12, either as the results of calculations within the analysis section or through any of the various methods for loading data described above. EDIT 22 contains many capabilities well known to those versed in the art, although, as in the input and output sections, the ability to handle each curve with it's individual sampling frequency is contained within this invention. The major functions within the edit section involve the ability to modify the well header information, the curve description and curve inventory information, and the ability to modify individual curve engineering values. Several utility functions are contained within this section, such as the ability to scan individual curves for values out of given ranges, to convert from one kind of engineering units to another kind, to delete curves, to modify the scaling records and comment records which the data base manager maintains to more fully describe the engineering values.

One of the more important functions of this section is to display the engineering values to the log analyst at the display terminal (CRT) 14, allowing the selection of any curve from the inventory maintained by the data base manager, specifically including dipmeter curves. Once selected for editing, the curve or curves requested are displayed on the screen and the user can, as required, review and alter any or all of the curves selected.

Specifically, within the present implementation, the log analyst can, at the terminal 14, review the data on the disk file 12, altering the display as necessary, change the display parameters either within the editing program alone or, if desired, for the entire system, depth shift curves, merge curves, or modify engineering values for curves.

The last three functions mentioned above require additional comments. When a variety of different well logs are run at the well site, the curves within any one run are always recorded together, and the values for one curve correspond to the appropriate values for other curves at this depth. Those versed in the art speak of these curves as being "on depth". If, however, several logging runs are performed, the logging tools, even if lowered to the same nominal depth, do not record from exactly the same place within the well bore. Part of the editing functions performed by the log analyst involves using experience and knowledge to move one set of curves relative to another until the two sets of curves are "on depth" with respect to each other. In this review and edit section are procedures to merge several curves into a single curve, if desired, or split a single curve into a number of other curves. The log analyst can desire to delete engineering values within a given section, modify all the values within a section, or modify individual data points. Missing data points can be detected and altered in this section also. All these functions can be performed at the terminal 14. The log analyst depends on this section to process the data manipulation requests expeditiously and display the results of the changes made.

As in other sections, since the edit section must honor the sampling frequency for each curve as it processes the curve, dipmeter data is managed within this section just like curves from all other sections.

The sections described above have dealt with the major data management sections within the log processing system. Those versed in the art will also recognize the necessity for a number of data management utilities not specifically discussed above. These utilities are needed to allow those using the file to monitor and, if necessary, repair the file if there is some kind of equipment or software failure, determine the file contents and the data it was last used, allocate new files, delete data no longer needed from within a file or entire files if requested, and other similar functions as the system requires. While all these functions are well known, the parts of these functions dealing with the data base manager are contained within this invention, and files containing dipmeter data can be handled within this section in the same fashion as files containing data from conventional logging tools.

With this discussion as background, those versed in the art can easily understand why the log analysis programs, LOG 24, LAS 26, DIP 28, and CROSS SECTION 30 and any reservoir engineering section and/or the production engineering section can use dipmeter data with conventional logs. All the analysis programs, just as in EDIT 22, must honor the sampling frequency for each curve; dipmeter curves just require more samples than other curves, but they are basically no different to this system 10. As above, another benefit arising from this system 10 is the ability of these analysis programs to mix data from a variety of sources, as described fully above. Since the original sampling rate is maintained within the data base, these analysis programs have access to the original engineering values without modification by resampling or approximations necessary for their functions in earlier versions.

With the log analysis programs (LAS 26 and CROSS SECTION 30) of the system 10, the log analyst can define well processing parameters, correct data for particular environmental conditions which may have been present when the data was recorded, visually display data either as a conventional well log plot or cross plot selected curves, display a histogram of any curve's values and compare the frequency with which particular engineering values for one curve occur in another curve, and a number of other data display functions, both general purpose and specialized for particular displays, as desired. The log analysis programs also are responsible for performing, displaying, and storing the results for a number of procedures common to analyzing well logs, i.e., calculating the resistivity of the water within the well bore, the density and porosity of the rock adjacent to the well bore, the determining the location of shale deposits and adjusting the values of other logs appropriately, determining if there are hydrocarbons within this well, their amount, type, and value, the location of the different types of rocks through which the well passes (lithology), and other similar functions. As above, since dipmeter data is presented to these log analysis programs just like any other type of data, curves from dipmeter logs can be used within these computer programs as desired by the log analyst in any place where the information on them can be necessary or desired for additional accuracy in the calculation.

The multi-well log processing system, LOG 24, performs many functions similar to the log analysis program (LAS 26), but has the additional capability of amalgamating the results of these functions across a number of different wells. Thus LOG 24 is primarily designed to perform field studies across a number of different wells, while LAS 26 focuses primarily on single well analyses. Although this distinction is clear in theory, in practice the functions of these two programs frequently intermix at the log analyst's convenience. LOG 24 can perform a number of editing functions, and LAS 26 can draw from other wells surrounding the well being analyzed for assistance in drawing appropriate conclusions. Here again, dipmeter data can be used just like any other data, and while these functions can be, and frequently are, well known to those versed in the art, the capability of dealing with each curve with it's own sampling frequency is covered by this invention. Similar comments apply to the CROSS SECTION 30, reservoir engineering section, and the production engineering section, all of which, like LOG 24, are designed to deal with analyses from many wells and which can, like LOG 24, contain individual well editing and data modification functions as might be convenient within the program.

The log processing system 10 allows a log analyst to rapidly interpret many logs, possibly from many wells. The processing of these logs formerly often required several separate computer runs. There are usually many different types of data problems and many possible parameters which have to be provided to complete the interpretation. This system, by providing timely response within a single system, allows the log analyst to attempt a variety of differing parameter selections before selecting a final set of parameters.

Now that the system 10 has been described in detail, examples will be provided below to illustrate the novel features of the present invention. If a portion of the data from any source has missing data points or has values far outside certain limits, either maximum or minimum limits, then the log analyst initiates a sequence to replace the invalid values within one log with valid values from another log. For example, if one of the resistivity logs has invalid values, the log analyst can use a valid dipmeter raw data log, either one of the multiple traces usually found in these logs, or combine several of these traces into a single trace, to replace the values within the resistivity log. The resultant values can be further manually edited if required. This synthesized signal can then be stored on the disk file 12 for later use by other programs. In a similar fashion, one or all of the dipmeter traces may be edited and corrected if required, either by synthesizing data from other logs or correcting invalid points, either manually or automatically, to improve the quality of the dipmeter analyses. Since all programs honor the sampling rates of the logging curves that are being edited, the synthetic section of the resistivity curve is from the usually higher sampling rate produced in the dipmeter log, and the synthetic section of the dipmeter log is produced at the same sampling rate as the valid sections of the dipmeter curve.

In another example, the log analyst can retrieve the resistivity data and the dip data, or any other logging data, and display it on the CRT 14, either beside or on top of each other, to determine if the logs agree in approximate values. The system 10 has the capability of automatically producing a correlation factor between a resistivity log and a dipmeter log by comparing the resistivity log to the dipmeter signal over a certain depth increment and then generating a correlation factor signal, such as a percentage of right values or an averaged value between the compared log signal, the resistivity log signal and dip signal over that depth increment. In this manner, the log analyst can determine if the two signals are of approximate agreement. Other mathematical and statistical tools are provided in the system 10, such as the capability for the log analyst to enter equations and processing schema which can be desired to process the data, but not specifically provided for in other parts of the system. All of these help the log analyst to determine the nature and content of subsurface formations, and all can process dipmeter data as well as conventional logs.

In another example, if the log analyst believes that there is a subterranean fault, such as by seeing a pattern of dips on a paper plot suggesting a general trend above a certain depth and an opposite trend below that depth, it is possible using the system 10 for the log analyst to look at the raw data provided to the analysis program, the results of the analysis, and thereby evaluate the accuracy of the processed data. After processing the dipmeter data, either automatically through the dipmeter system described above, or manually through an interactive dipmeter calculation program (as is well known to those versed in the art) the system 10 stores, among a variety of other data, the dip azimuth, dip magnitude, and dip quality as individual curves on the disk file 12. Therefore, the log analyst can use the crossplot, histogram, statistical analysis and data display features in LAS 26 to look at the dip azimuth and dip magnitude just as with any curve from any source; and these curves can be analyzed with any other curves, either raw data or calculated results. This feature of using a normal log analysis program to look at dip azimuth and dip magnitude has not been possible in the past because the dip programs have not been in the same format nor placed on the same system as the conventional well logs. Since these results are stored within the same system, the user can try several possible values and several different solutions, relying on the ability of log processing programs within the system 10 to process and report results in a timely fashion. The use of the crossplot, histogram and data display features from the log analysis system on dipmeter data can confirm a bimodal distribution of dip azimuth such as in the above example, if the lower azimuth dips tending to occur below the depth in question while higher azimuth dips occurred above the depth in question.

In another example, if logs, such as water saturation, permeability, porosity, resistivity, and the like, are available, then the log analyst using the system 10 can depth shift the logs so that the logs are all on the same depth with respect to each other, and then using LAS 26 produce the lithology, water saturation, pay zone logging curves, as is well known in the art. Then the log analyst can make an artificial discriminator curve on the basis of whether the investigating device or logging tool was passing through shale at that point and plot dips using the dipmeter program 28 if it was going through shale. Then the log analyst can plot a second set of dips for those going through sandstones. These two conditions produce different types of dipmeter plots with differing types of information, and are confounded in a conventional plot. Using the unique features of the system 10, as above described, the log analyst can produce these two different types of plots, one for dips in shale formations, a second plot for dips in sandstone formations, with ease. The log analyst can use the crossplot function of the log analysis program (LAS) 26 to produce separate crossplots or paper plots of dips according the pay and water saturation or other analytical results as desired. Within the system 10 outlined above, the user is presented with a variety of different basic tools all of which are useable in any logically consistent order. The user can, for example, elect to present crossplots and paper plots not explicitly provided for within the thinking of those writing the programs by developing his own discriminator function and plotting according to that function. For example, the user can elect to present a crossplot of dip azimuths which occurred with a specific range of dip magnitudes, with letters representing the zones through which the borehole passes and colored according to the oil saturation calculated therein. Finally, the log analyst can determine the dip azimuth histograms on any dips running through the shale, above and below any suspected discontinuity. In this manner, the log analyst can determine exactly what the dip azimuth and dip values or dipping zonations are through different types of rocks. Heretofore this would have required a much longer time and much expert judgement. Using Log Processing System in one embodiment of the present invention, the log analyst is capable, on a single workstation, of determining what the type of formations within the substructure, then altering the dipmeter analysis to produce the best dipmeter plot for the formation on a single system within a short time.

Whereas the present invention has been described in particular relation to the drawing attached hereto, it should be understood that other and further modifications, apart from those shown or suggested herein, may be made within the scope and spirit of the present invention.

I claim:

1. A method for exploring a subsurface formation utilizing log signals and dip signals derived from at least one investigating device passed through a borehole traversing the formation, comprising:

(a) storing each signal as a value individually within a universally formatted relational database;

(b) identifying any portions of the log signal and the dip signal that are unacceptable; and (c) replacing the identified unacceptable portions of either of the signals with a corresponding acceptable portion from the other signal.

2. A computer based log processing system for exploring a subsurface formation using log signals and dip signals derived from at least one investigating device passed through a borehole traversing the formation, comprising:

first signal processing means for storing each signal as a value individually within a universally formatted relational database;

second signal processing means for identifying any depth incremented portions of the log signal and the dip signal that are unacceptable; and third signal processing means for replacing the identified unacceptable depth incremented portions of either of the signals with a corresponding acceptable depth incremented portion from the other signal.

3. The system of claim 2 wherein each stored signal has its own implicit depth reference.

4. The system of claim 3 wherein each signal's implicit depth reference includes top, base and sample increment.

5. The system of claim 2 and including means within the second signal processing means for determining if any signal portion contains missing data points.

6. The system of claim 2 and including means within the second signal processing means for determining if any signal portion has a value outside of as predetermined, acceptable range of values.

7. The system of claim 2 and including means for averaging the values of the dip signals over a given depth range to produce a synthesized resisitivity signal that is insertable into the log signal at the corresponding depth increment.

* * * * *